United States Patent
Ruetschi et al.

(10) Patent No.: US 7,418,084 B2
(45) Date of Patent: Aug. 26, 2008

(54) SYSTEMS AND METHODS FOR THIRD-PARTY CALL CONTROL

(75) Inventors: Johannes Ruetschi, Boca Raton, FL (US); Leroy Edwin Gilbert, Wellington, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 929 days.

(21) Appl. No.: 10/918,992

(22) Filed: Aug. 16, 2004

(65) Prior Publication Data

US 2006/0034429 A1    Feb. 16, 2006

(51) Int. Cl.
*H04M 1/21* (2006.01)
*H04M 3/08* (2006.01)
*H04M 3/22* (2006.01)

(52) U.S. Cl. ............... 379/32.01; 379/32.05; 379/93.32; 379/100.05; 379/207.04

(58) Field of Classification Search ............. 379/32.01, 379/32.04, 32.05, 93.11, 93.31, 93.32, 93.34, 379/100.05, 100.06, 100.14, 102.01, 102.02, 379/207.04, 211.14, 221.15, 265.01, 309
See application file for complete search history.

(56) References Cited

U.S. PATENT DOCUMENTS 5,241,588 A * 8/1993 Babson et al. ......... 379/201.03
6,480,597 B1 * 11/2002 Kult et al. .................. 379/242
7,111,056 B1 * 9/2006 Ramey et al. ............... 709/223

* cited by examiner

*Primary Examiner*—Binh K Tieu

(57) ABSTRACT

The present invention may include a call controller for initiating third-party call control requests. The invention may also include an endpoint control manager for determining whether a remote endpoint is a simple endpoint or intelligent endpoint. The invention may further include an intelligent device manager for coordinating third-party call control requests from the call controller for endpoints determined to be intelligent by the endpoint control manager, and a simple device manager for coordinating third-party call control requests from the call controller for endpoints determined to be simple by the endpoint control manager.

23 Claims, 3 Drawing Sheets

SYSTEMS AND METHODS FOR THIRD-PARTY CALL CONTROL

BACKGROUND OF THE INVENTION

The present invention relates generally to telecommunications networks and, more particularly, to systems and methods for the transmission of voice and data information over a communications network, including the routing, interconnection, and third-party control of such information.

In the past, telephone calls and the voice data associated with such calls were transmitted over conventional plain old telephone systems. More recently, Voice-over-IP (VOIP) technology has emerged as a popular and cost effective alternative for transmitting and receiving voice data. VOIP technology has created an opportunity for telecommunications providers to combine both voice and data services through one medium. This convergence has resulted in the possibility of using separate networks for transmitting and controlling communications (i.e., one network to provide a communications path and another different network to initiate and control a communications session).

The ability to initiate a communications session independent of the endpoints connected to the transmission channels is generally referred to as third-party call control. An example of third-party call control is a click-to-dial capability that allows a user to initiate voice communications from a computer.

Providing session control independently of the endpoints involved in transmitting call information provides applications engineers with a host of new service options. For example, in addition to click-to-dial services, third-party call control typically supports flexible conference control services, such as network-initiated streaming content services, and the ability to provide a general set of application programming interfaces (APIs) accessible to third-party application developers.

Modern multimedia networks allow for the separation of the signaling from media transport and for the separation of applications from the signaling and media aspects of a communications session. Third-party application servers can create, delete, and modify the attributes of parties participating in a call.

Third-party call control interfaces, however, such as Computer Supported Telecommunications Applications (CSTA), Java Telephony Application Programming Interface (JTAPI), and Advanced Intelligent Network (AIN) were created during a time period when central network entities were assumed to be intelligent software controlled computer systems and the network endpoints (e.g., telephones) were relatively simple devices.

As the cost of relatively powerful digital processing devices has decreased and the ability to provide high bandwidth data connections has improved, intelligent multifunctional endpoints have emerged. Although these endpoints have sophisticated autonomous features, they often have difficulty interacting with 3PCC services within the network. Further complicating this problem from the network standpoint is the presence of both simple and intelligent endpoints connected to the same network, each of which may require different commands to effectively and efficiently execute third-party call control.

Accordingly, what is needed is a communications network with the ability to discriminate between simple and intelligent endpoints to provide third-party call control services that are appropriate for each endpoint type.

In view of the foregoing, it would therefore be desirable to provide systems and methods that allow intelligent endpoints to effectively interact with networks having third-party call control features.

It would also be desirable to provide systems and methods that allow networks that provide third-party call control features to effectively interact with both intelligent and simple endpoints.

It would therefore be further desirable to provide systems and methods that allow a communications network to provide third-party call control features that discriminate between simple and intelligent endpoints and provide third-party call control features that are appropriate for each endpoint type.

SUMMARY OF THE INVENTION

It is therefore an object of the present invention to provide systems and methods that allow intelligent endpoints to effectively interact with networks having third-party call control features.

It is therefore an object of the present invention to provide systems and methods that allow networks that provide third-party call control features to effectively interact with both intelligent and simple endpoints.

It is a further object of the present invention to provide systems and methods that allow a communications network that provides third-party call control features to discriminate between simple and intelligent endpoints and to provide third-party call control features that are appropriate for each endpoint type.

These and other objects of the invention are provided in accordance with the principles of the present invention by providing third-party call control to simple and intelligent endpoints. The present invention may include a call controller for initiating third-party call control requests. The invention may also include an endpoint control manager for determining whether a remote endpoint is a simple endpoint or intelligent endpoint. The invention may further include an intelligent device manager for coordinating third-party call control requests from the call controller for endpoints determined to be intelligent by the endpoint control manager, and a simple device manager for coordinating third-party call control requests from the call controller for endpoints determined to be simple by the endpoint control manager.

BRIEF DESCRIPTION OF THE DRAWINGS

The above and other objects and advantages of the present invention will be apparent upon consideration of the following detailed description, taken in conjunction with the accompanying drawings, in which like reference numbers refer to like parts throughout, and in which.

DETAILED DESCRIPTION OF THE INVENTION

Figure 1:
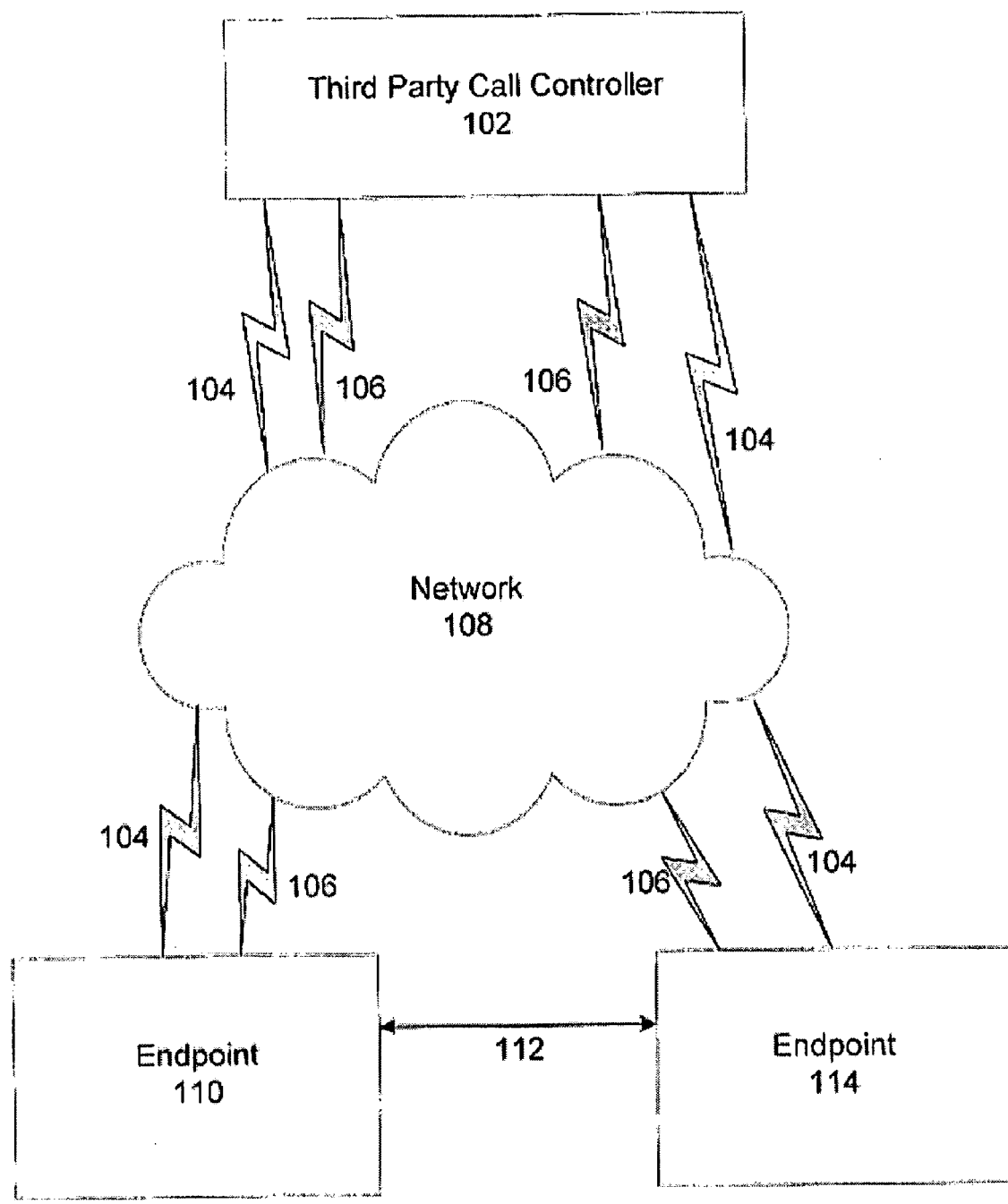
FIG. 1 shows a generalized block diagram of a system constructed in accordance with the principles of a preferred embodiment of the present invention for providing third-party call control to intelligent and simple user endpoints.

FIG. 1 shows a generalized block diagram of a system 100 for providing third-party call control to intelligent and simple user endpoints 110 and 114. The system may include third-party call controller 102, session initiation request link 104, session setup link 106, network 108, endpoints 110 and 114, and voice/data communications link 112.

In operation, controller 102, which may be any suitable request-processing device such as a computer or server, may communicate with endpoints 110 and 114 to request, initiate, control, and monitor voice and/or data communications between the endpoints via network 108. For example, controller 102 may transmit session initiation requests to endpoints 110 and 114 (which may be any smart or simple electronic communications device such as a hard wired phone, a wireless phone, PDA, personal or network computer, etc.) via link 104 (generally within or part of network 108) to schedule or request a communications session.

Such requests may be conveyed, at least in part, over network 108, which includes a network switching system preferably having known soft switching capabilities. Network 108 may also interface with various other external public or private networks such as the Internet, an intranet, a wireless network, or other communications network. Once a session request has been accepted by the endpoints, session setup and connection information, such as interconnection details, may be transferred to endpoints 110 and 114 via setup link 106 (also generally within or part of network 108). The session requests may include polling of the endpoints 110 and 114 to determine if they are smart or simple endpoint types so the appropriate third-party call control commands or protocols are used. In some embodiments, links 104 and 106 may be integrated into a single communications path if desired (not shown).

Interconnection information may include information necessary to identify, initiate, and monitor a connection between user endpoints over a particular communications link 112 that will be used to transmit voice and/or data information. It will be appreciated that link 112 may include or be comprised of conventional voice communications links such as traditional hardwired or wireless communications links that are intended to carry voice or multimedia information to and from the user endpoints, whereas links 104 and 106 may be separate from link 112 (and one another) and are preferably data links suitable to perform the scheduling and control tasks mentioned above. However, in alternate embodiments links 104, 106, and 112 may be substantially the same type of communication link.

System 100 may be used to allow third parties to initiate, monitor, and release calls between two other parties. For example, system 100 may be used in "click-to-dial" applications wherein an external party, such as a customer logged onto a computer, may initiate voice communications between the customer and a sales representative of an e-commerce site from the customer's computer.

This may be accomplished, for example, by the customer clicking on a telephone link on a web page that causes controller 102 to setup and initiate a call between the customer's simple phone (e.g., endpoint 110) and the sales representative's smart phone (e.g., endpoint 114) via links 104 and 106. This task typically would include controller 102 scanning, polling, or otherwise determining (such as through a device identification, a database, or previously acquired information) the capabilities of each endpoint and subsequently scheduling and initiating the call using the appropriate techniques or commands known in the art based on the respective capabilities of each endpoint. Controller 102 may monitor the call in progress and provide the option to implement additional appropriate third-party call control features while the call is in progress.

Figure 2:
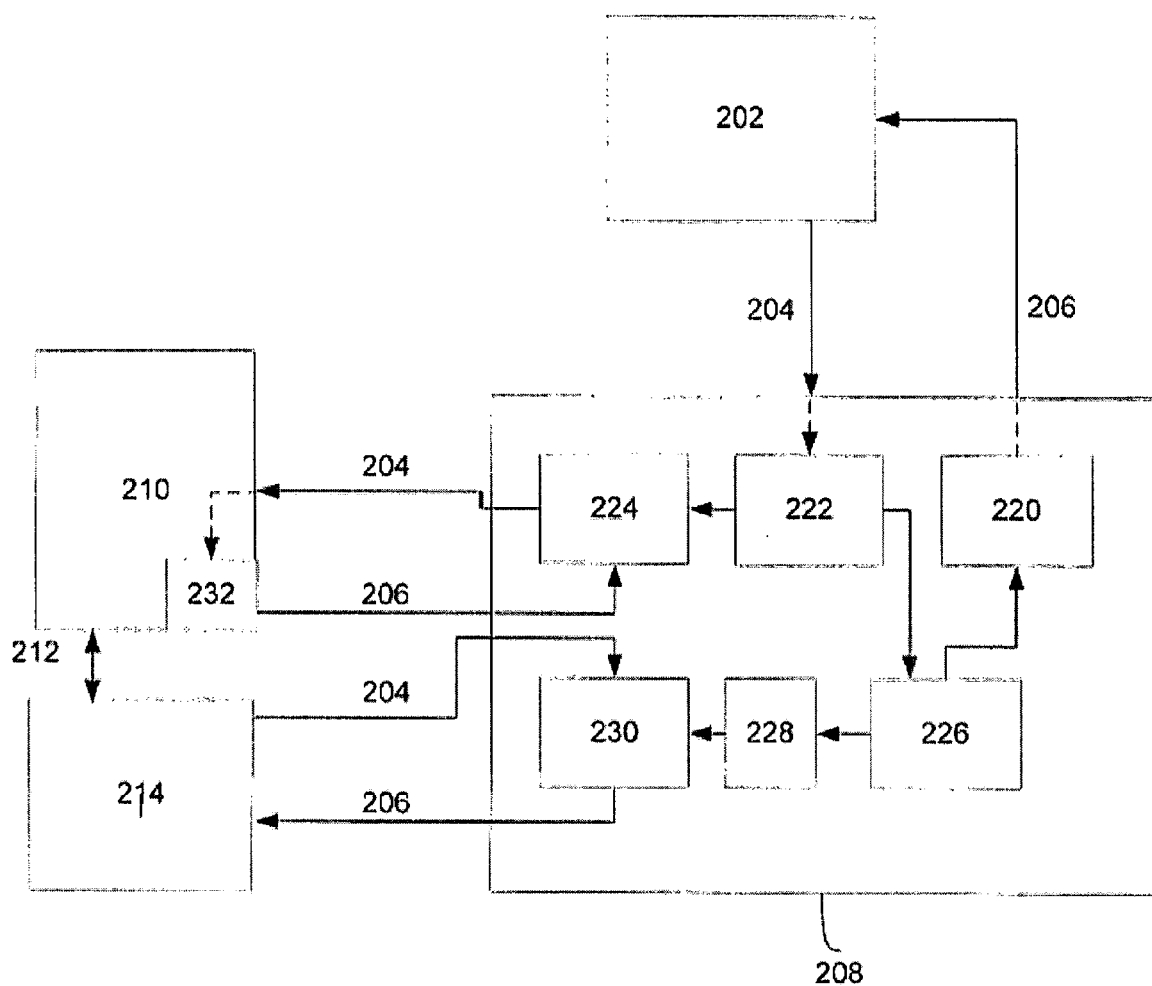
FIG. 2 is a more detailed block diagram of one possible specific embodiment of the system shown in FIG. 1.

FIG. 2 shows a more detailed block diagram of one preferred embodiment 200 of the communications system shown in FIG. 1. More specifically, the system of FIG. 2 may include a third-party call control server 202 (that corresponds to controller 102 in FIG. 1), an intelligent endpoint 210 with feature control engine 232, a simple endpoint 214, and network 208 (which corresponds with network 108 of FIG. 1). Network 208 may include monitoring component 220, user endpoint manager 222, intelligent device manager 224, call routing and control engine 226, feature control engine 228, and simple device manager 230.

It will be understood that although the elements within network 208 are depicted within close proximity of one another, these resources may be distributed remotely from one another throughout network 208 as needed by particular network configurations or as deemed appropriate by network engineers. There is no specific need to concentrate these resources in one particular area.

In FIG. 2, third-party call control may be initiated by call control server 202 issuing a third-party feature request over link 204 to endpoint control manager 222. Such requests may include commands that make a call from endpoint 210 to 214 over link 212, answer a call at endpoint 210, or release a call in progress at endpoint 214, etc.

After receiving the third-party feature request from server 202, endpoint control manager 222 may determine the endpoint type (smart, simple, or having certain specific capabilities, etc.) by polling endpoints 210 and 214 using one or both of device managers 224 and/or 230. This determination may include any suitable method for ascertaining the capability of the endpoint such as polling, scanning, cross-referencing a database of device information, etc.

If the endpoint type is capable of receiving third-party call control feature requests of a particular type (e.g., make a call) then the request may be passed to the appropriate device manager, in this case intelligent device manager 224, for processing and execution. The appropriate command is then transmitted along link 204 to feature control engine 232 for execution by intelligent endpoint 210.

If, however, endpoint control manager 222 determines that the endpoint is a simple endpoint type, or cannot otherwise execute the issued third-party call control command, then endpoint control manager 222 may control the features through the feature control engine 228 that is associated with routing and control engine 226 and simple device manager 230.

Using the system described above, substantially similar features and functionality can be provided in the most appropriate way to both simple and intelligent communication devices. The determination of the capabilities of each device can be pre-configured in a database or dynamically determined at call time through a capability exchange protocol such as by polling or any other suitable method. The dynamic selection of an intelligent or simple control point for third-party call control allows the present invention to provide both efficient and effective control of endpoint communication devices with varying capabilities.

While a call is in progress, monitoring component 220 may monitor the calls and call states of endpoints 210 and 214 to determine the state of each endpoint and what call features may be possible or appropriate at any given time. Monitoring component 220 may periodically issue reports back to server 202 to provide the status of various endpoints connected to the network.

In some embodiments, call monitoring may be accomplished using device managers 224 and 230. In the embodiment shown in FIG. 2, however, monitoring tasks are preferably consolidated into a central point (i.e., monitoring component 220) irrespective of where the third-party call control feature controller resides (e.g., managers 224 and 230). One advantage of this type of arrangement is that message flow from the endpoints to the switching system is eliminated, which reduces the load on the switching system in network 208, thereby significantly improving system throughput and performance.

Server 202 may track the progress of calls and feature requests by correlating call and feature requests with certain system events or other indicia such as with feature request identification numbers (which may be unique for each feature request). Similarly, the signaling used for each call may also carry a unique identification number or other indicia to facilitate system management. In some embodiments, correlation of system features may involve using matching request call identification numbers. Moreover, when a call request requires the generation of a new call, the call identifier may be matched to the request identifier or may be derived from the request identifier, such that the call identifier is understood by monitor 222. For example, the call identifier may use the request identifier plus a fixed length random number selected by feature control engine 232.

Figure 3:
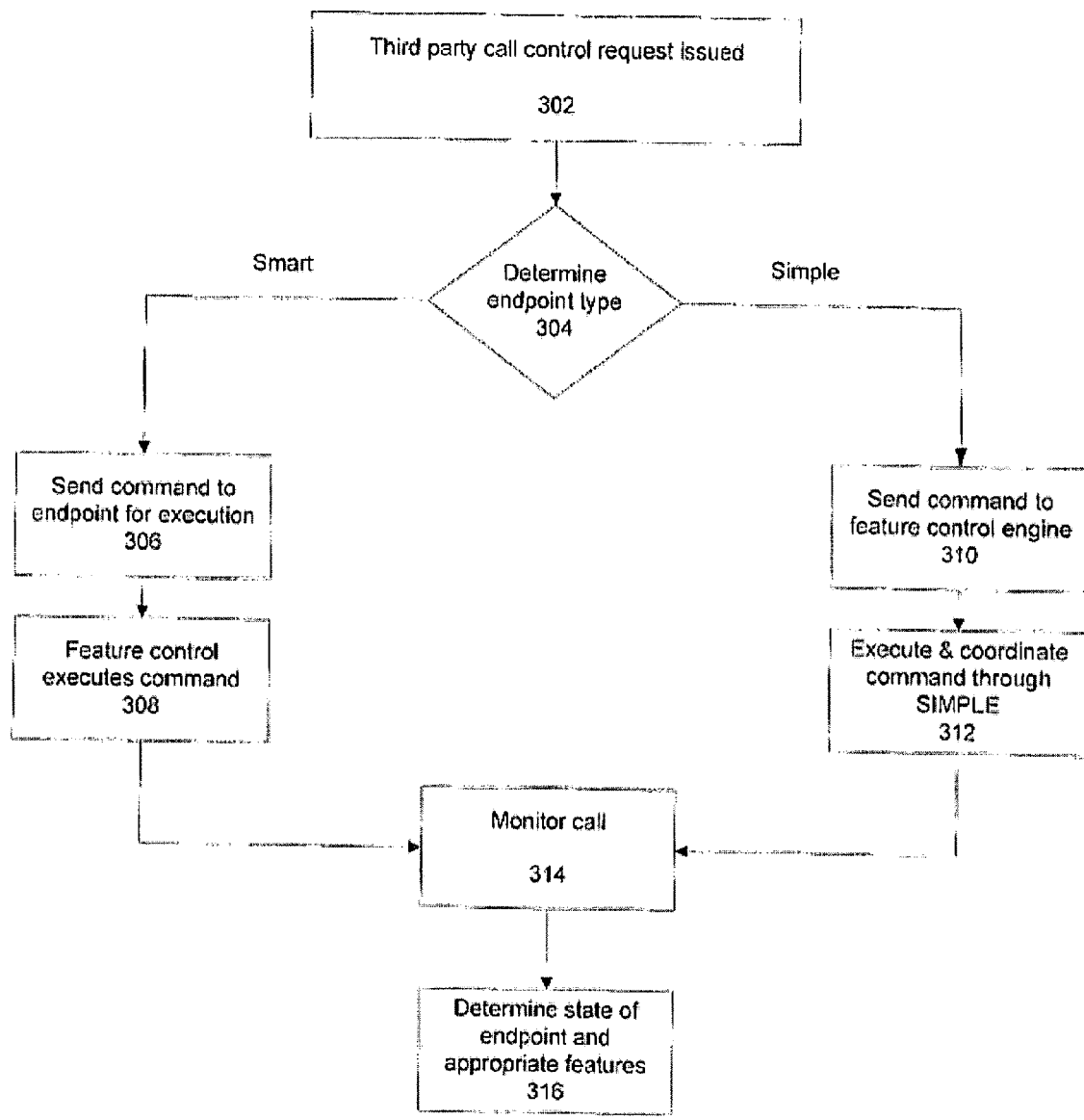
FIG. 3 is a flow chart illustrating some of the steps involved in providing third-party call control to intelligent and simple user endpoints in a preferred embodiment of the invention.

Some of the steps involved in a third-party call control communication method according to a preferred embodiment of the present invention are illustrated in flow chart 300 shown in FIG. 3 and are described below.

At step 302, third-party call control may be initiated by call control server 202 issuing a third-party feature request to endpoint control manager 222. At step 304, after receiving the third-party feature request from server 202, endpoint control manager 222 may determine the endpoint type by polling endpoints 210 and 214 using the appropriate device managers (224 or 230).

At step 306 if the endpoint type is capable of receiving third-party call control feature requests of a particular type, the request may be passed to the appropriate device manager, in this case intelligent device manager 224, for processing. At step 308, feature control engine 232 may execute the request.

If, however, at step 304 it is determined that the endpoint is a simple endpoint type, then at step 310, endpoint control manager 222 may send third-party control feature requests through feature control engine 228. At step 312, feature control engine 228 along with routing and control engine 226 and simple device manager 230 may execute and coordinate the third-party control feature requests.

At step 314, with a call in progress, monitoring component 220 may monitor the calls and call states of endpoints 210 and/or 214 to determine the state of each endpoint and what call features may be possible or appropriate at any given time. It will be appreciated that these steps are not intended to be comprehensive or necessarily performed in the order shown.

Thus, systems and methods for improved third-party call control for intelligent and simple endpoints are provided. Moreover, it will be understood that the foregoing is only illustrative of the principles of the invention and that various modifications can be made by those skilled in the art without departing from the scope and spirit of the invention. Accordingly, such embodiments will be recognized as within the scope of the present invention.

Persons skilled in the art will appreciate that the present invention can be practiced by other than the described embodiments, which are presented for purposes of illustration rather than of limitation and that the present invention is limited only by the claims that follow.

What is claimed is:

1. A system for providing third-party call control to simple and intelligent endpoints comprising:
    a call controller for initiating third-party call control requests;
    an endpoint control manager for determining whether a remote endpoint is simple or intelligent;
    an intelligent device manager for coordinating third-party call control requests from the call controller for endpoints determined to be intelligent by the endpoint control manager; and
    a simple device manager for coordinating third-party call control requests from the call controller for endpoints determined to be simple by the endpoint control manager.

2. The system of claim 1, further comprising a monitor component that monitors the state of calls in progress.

3. The system of claim 2, wherein the monitoring component is centrally located within a switching network.

4. The system of claim 3, wherein the monitoring component is centrally located within the switching network such that the status messaging from the endpoints is substantially reduced.

5. The system of claim 1, wherein the endpoint control manager dynamically determines whether the endpoint is smart or intelligent.

6. The system of claim 1, wherein the endpoint control manager dynamically and with a database determines whether the endpoint is smart or intelligent.

7. The system of claim 1, further comprising a feature control engine that controls third-party call control features of simple endpoints.

8. The system of claim 7, wherein the feature control engine generates a call identification number and a request identification number to track the progress of calls and feature requests.

9. The system of claim 8, wherein the request identification number matches the call identification number when the feature request is intended to control an existing call.

10. The system of claim 8, wherein the call identification number matches the request identification number when the feature request requires the generation of a new call.

11. The system of claim 8, wherein the call identification number is derived from the request identification number when the feature request requires the generation of a new call.

12. The system of claim 11, wherein the call identification number includes the request identification number and a fixed length random number.

13. A method for providing third-party call control to simple and intelligent endpoints comprising:
    initiating third-party call control request with a call controller;
    determining whether a remote endpoint is simple or intelligent;
    coordinating third-party call control requests from the call controller for endpoints determined to be intelligent by the endpoint control manager; and
    coordinating third-party call control requests from the call controller for endpoints determined to be simple by the endpoint control manager.

14. The method of claim 13, further comprising monitoring the state of calls in progress.

15. The method of claim 14, wherein monitoring the state of calls in progress is accomplished within a switching network.

16. The method of claim 13, wherein determining whether a remote endpoint is simple or intelligent is accomplished dynamically.

17. The method of claim 13, wherein determining whether a remote endpoint is simple or intelligent is accomplished dynamically and with a database.

18. The method of claim 13, further comprising controlling third-party call control features of simple endpoints using a feature control engine.

19. The method of claim 18, wherein controlling third-party call control features of simple endpoints using a feature control engine includes generating a call identification number and a request identification number to track the progress of calls and feature requests.

20. The method of claim 19, wherein the request identification number matches the call identification number when the feature request is intended to control an existing call.

21. The method of claim 19, wherein the call identification number matches the request identification number when the feature request requires the generation of a new call.

22. The method of claim 19, wherein the call identification number is derived from the request identification number when the feature request requires the generation of a new call.

23. The method of claim 22, wherein the call identification number includes the request identification number and a fixed length random number.

* * * * *